United States Patent [19]

Dembicki et al.

[11] 4,389,266

[45] * Jun. 21, 1983

[54] PREPARATION OF GLASS CONTAINER FOR THERMOPLASTIC CLOSURE

[75] Inventors: Michael T. Dembicki; William J. Poad, both of Brockport, Pa.

[73] Assignee: Brockway Glass Co., Inc., Brockway, Pa.

[*] Notice: The portion of the term of this patent subsequent to Apr. 13, 1999, has been disclaimed.

[21] Appl. No.: 339,340

[22] Filed: Jan. 15, 1982

Related U.S. Application Data

[63] Continuation-in-part of Ser. No. 233,056, Feb. 10, 1981, Pat. No. 4,324,601, which is a continuation-in-part of Ser. No. 86,398, Sep. 19, 1979, Pat. No. 4,260,438.

[51] Int. Cl.³ .................... B67B 3/00; B32B 17/10; C03C 15/00; C03C 21/00
[52] U.S. Cl. .................. 156/69; 427/154; 427/224; 427/389.7; 428/410; 428/426; 428/427; 428/432; 53/287; 53/478; 65/24; 65/30.1; 65/60.2; 65/111; 65/117; 65/120; 156/82; 156/322; 156/497; 156/629; 156/663; 215/232; 215/DIG. 2; 413/5
[58] Field of Search .................. 53/287, 329, 478; 65/24, 30.1, 60.2, 111, 117, 120; 156/69, 82, 322, 497, 629, 663; 215/232, DIG. 2; 427/154, 224, 314, 373, 387, 389.7; 428/35, 410, 426, 427, 432; 413/5

[56] References Cited

U.S. PATENT DOCUMENTS

| | | |
|---|---|---|
| 3,249,246 | 5/1966 | Mahoney ............................ 65/33 X |
| 3,787,326 | 1/1974 | Deyrup ....................... 260/438.5 R |
| 3,827,871 | 8/1974 | Budd ................................ 427/422 X |
| 3,900,689 | 8/1975 | Deyrup ............................ 156/326 X |
| 3,926,604 | 12/1975 | Smay et al. ...................... 427/421 X |
| 4,260,438 | 4/1981 | Dembicki et al. ..................... 156/69 |
| 4,324,601 | 4/1982 | Dembicki et al. ..................... 156/69 |

OTHER PUBLICATIONS

Advances in Chemistry Series, "Chromium Complexes", F. B. Hauserman, 1957, pp. 338–355.

Primary Examiner—Robert A. Dawson
Attorney, Agent, or Firm—Christel, Bean & Linihan

[57] ABSTRACT

A method for sealing a rim-like opening in a glass container is described. The surface of the opening is treated with tin and/or titanium oxide precursors and with or without one or more of the groups consisting of fluorides, sulfur oxides and sulfur oxide precursors and then overcoated with a chromium III organic metallic complex. A membrane comprising a thermoplastic film is pressed onto the coated opening surface and heated to cause glass-plastic adhesion, forming a closure. The coating steps may be applied to glass containers immediately after forming and annealing as appropriate, or may be applied to glass containers taken from storage.

32 Claims, 2 Drawing Figures

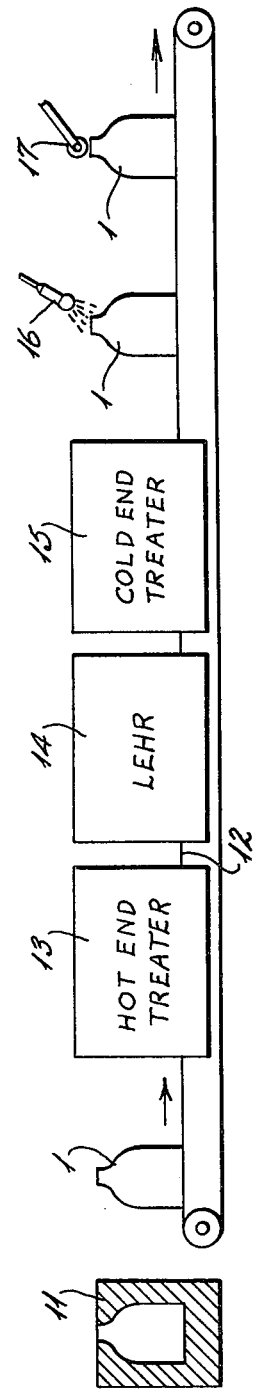
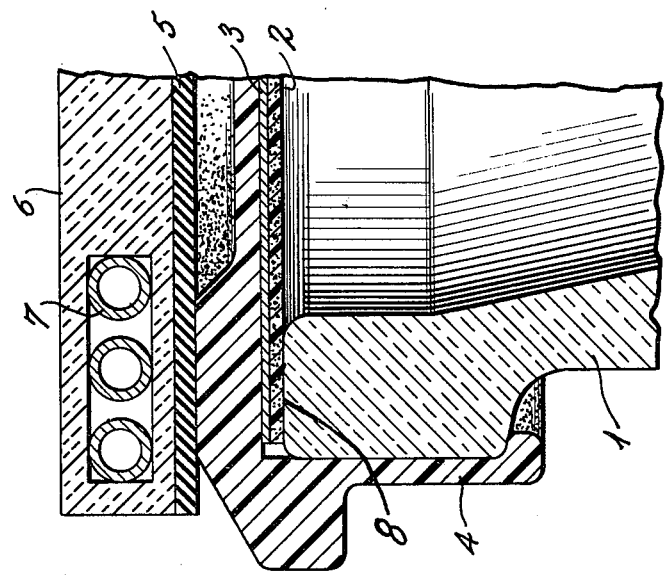

PREPARATION OF GLASS CONTAINER FOR THERMOPLASTIC CLOSURE

CROSS-REFERENCE TO RELATED APPLICATIONS

This application is a continuation-in-part of U.S. patent application Ser. No. 233,056, filed Feb. 10, 1981, now U.S. Pat. No. 4,324,601, which is in turn a continuation-in-part of Ser. No. 086,398, filed Sept. 19, 1979, now U.S. Pat. No. 4,260,438.

BACKGROUND OF THE INVENTION

This invention relates to the preparation of glass containers for thermoplastic membrane sealing. Heat activated membrane seals for plastic containers are common in the packaging and canning art. Generally a membrane, which may be a laminate of aluminum foil and a thermoplastic polymer, is pressed on the rim of a plastic container and heated to form polymer-polymer adhesive contact. The problem with this method when used with soda-lime-silica glass containers is that the failure of the seal will generally occur within a few days of sealing due to poor initial adhesion between the glass and the polymer or poor durability of the adhesion.

Substantially improved adhesion between a membrane seal and a container finish is obtained by subjecting the finish to a high termperature treatment which modifies the finish surface. This high temperature treatment preferably is conducted immediately after the containers are formed and comprises contacting the finish with a decomposible fluorine-containing compound; a compound which decomposes to form a metal oxide; a compound which decomposes to form a sulfur oxide; sulfur oxides; and combinations of the above. These treating materials may be used in any order or combination, or the metal oxide precursor may be used alone.

A sealing closure for the container is formed by pressing a membrane comprising a thermoplastic film onto the container finish and heating to form a glass/plastic adhesive bond. The membrane desirably may be an aluminum foil-thermoplastic film laminate. It may also be a polymer sheet, a laminate of polymer, a paper/polymer laminate or a laminate of one or more layers of polymers, metal foil, and paper.

This described technique provides a reliable and secure closure so long as the container finish remains uncontaminated. However, during cold end treatment of the containers after annealing, it was found that the treating material, typically an organic polymer, stearate or silicone, would occasionally be deposited on the container finish to the extent that erratic sealing results were obtained.

SUMMARY OF THE INVENTION

A glass container is first subjected to a hot end treatment in which the finish, or sealing surface, is modified by a tin or titanium oxide treatment so as to enhance its adhesion to a thermoplastic closure. The container is then annealed and the exterior surface of the container is coated with a lubricity enhancing material which increases the abrasion and scratch resistance of the glass. Contamination of the container finish by the lubricity enhancing material is removed by subjecting only the finish to a brief heat treatment at a temperature below which flame polishing, or surface melting, of the glass occurs. A chromium (III) organic metallic complex is then coated on the finish. Thereafter, a closure seal is formed by pressing a membrane comprising a thermoplastic film over the container finish and heating to form a glass-plastic adhesive bond.

Hence, it is an object of this invention to provide a method for obtaining durable seals between a glass container and a thermoplastic membrane.

It is a further object of this invention to treat the finish of a glass container so as to obtain a dependable and durable seal with a thermoplastic material.

A further object of this invention is to remove contaminating materials from the surface-modified finish of a glass container and to obtain reliable adhesion to a thermoplastic closure.

An additional object of the invention is to provide glass containers with durable seals having long term integrity to enable the commercial packaging of liquid product in said containers.

A specific object of this invention is to treat the finish of a glass container with a tin or titanium compound to form a tin or titanium oxide coating, to remove any contaminating material from said coating, and to coat the finish with a chromium (III) organic metallic complex so as to obtain reliable adhesion to a thermoplastic closure.

BRIEF DESCRIPTION OF THE DRAWING

FIG. 1 is a diagrammatic flow sheet showing the steps to prepare a glass container for use in this invention.

FIG. 2 is a partial view—in section of the upper portion of a glass container showing the mode of attaching a metal foil—thermoplastic film membrane to the container sealing surface.

DETAILED DESCRIPTION OF THE INVENTION

The invention comprises the preparation of a glass container for use with a seal comprising a membrane closure as an alternative to, or in combination with, the conventional screw cap for glass containers. A membrane comprising a thermoplastic polymer is heat sealed to the sealing surface of the glass container. Heat sealing may be accomplished by pressing the membrane to the glass at a temperature near or above the softening point of the thermoplastic but below its melting point as by use of a heated platen. The membrane may be covered by a plastic or metal snap-on or screw-on cap prior to or subsequent to sealing. The membrane desirably may be metal foil-thermoplastic polymer laminate, which allows induction or conduction heating of the laminate.

Without the use of the treatment described herein, a serious problem with this type of seal is its vulnerability to humidity. Various coatings have been applied to overcome this problem, commonly being metallic oxides. While the latter may provide a seal sufficient for commercial purposes, its use in combination with a fluoride or sulfate treatment is generally preferred.

Treating glass surfaces with sulfur oxides or decomposable fluorine compounds and treatment with sulfur and flourine compounds are well known. These are shown, for example, in U.S. Pat. No. 3,249,246. Additionally, treatment of glass substrates with chromium organic compounds for the purpose of improving bonding of the glass surface with organic polymers is described in U.S. Pat. No. 3,900,689.

However, the use of these methods for improving the stability of a polymer/glass bond in the presence of water vapor, enabling the employment of a thermoplastic membrane seal for glass containers has not been shown. The further treatment of the sealing surface to supply a metal oxide coating before or after the fluorine or sulfur oxide treatment results in further improvement in glass/polymer bond stability. Contamination of the so-treated finish of a glass container by contact therewith by conventional cold end lubricity enhancing agents interferes with the integrity of a polymer-glass seal. Removal of any lubricity enhancing agent from the sealing surface or finish after metal oxide coating, if such material is employed, and further treatment thereof with a chromium organic metallic compound results in a remarkable increase in the stability of bond between the membrane seal and the finish. It is to be noted that conventional sealing closures are unaffected by the presence of lubricity enhancing agents or lubricious materials on the container finish. However, large amounts cause cap backoff problems, that is, the cap loosens on the shelf.

Referring now to FIG. 1 there is shown the sequential steps required for preparing a glass container for use in this invention. A glass container or jar 1 is formed in the mold 11 of a forming machine at a high temperature, normally about 1000 to 2000 degrees F., as is conventional. The containers 1 are carried on conveyor 12 to the hot end treater 13 wherein the container finish is subjected to a chemical treatment which renders the finish surface durably bondable to a thermoplastic membrane.

Although the containers 1 are conveyed immediately from the forming mold 11 to the hot end treater 13, they have cooled considerably at this point and display a temperature generally in the range of about 800 degrees to about 1200 degrees F. While at this temperature, the sealing surface or finish of the containers is contacted with a material or materials which act upon and modify the surface properties of the glass. These materials include generally (1) certain fluorine containing compounds, and/or sulfur oxides and/or sulfur oxide precursors with (2) tin or titanium compounds which decompose to form metal oxides and the treatment temperatures.

The fluorine compounds comprise generally these which decompose upon heating to treatment temperatures, i.e., from 800 degrees to about 1200 degrees F., and include specifically the alkyl fluorides as, for example, 1,1-difluoroethane; ammonium fluorides including $NH_4F$ and $NH_4HF_2$; metal fluorides such as $SnF_4$, $BF_3$, $AlF_3$, and the like; and metallo-organic fluorides such as $NH_4SnF_3$ and $(CH_3)_2SnF_2$. Sulfur compounds useful in this invention include sulfur dioxide, sulfur trioxide and sulfur compounds, e.g., ammonium persulfate, which decompose to sulfur oxides at treatment temperatures. Metal compounds employed are those which thermally decompose to form metal oxides and preferably comprise tin or titanium chlorides.

Hot end treatment is accomplished by impinging the treating material, either as a liquid or gas stream, upon the finish surface. Alternatively, the treating material may be fed as a gas, along with a fuel such as natural gas, to a burner and the burner flame directed to play on the finish surface. Treatment time required is short, on the order of a few seconds, but extended treatment times do not detract from results obtained.

One preferred hot end treatment comprises contacting the finish surface with both a fluorine containing compound and a metal oxide precursor such as tin tetrachloride. The order of contact makes no significant difference in the results obtained with either the fluoride compound or the metal oxide precursor being applied first. The two treating materials may also be simultaneously applied.

After hot end treatment is complete, the containers are passed through lehr 14, which may be of the tunnel type, where they are slowly annealed. Containers exit from the lehr at a relatively cool temperature, on the order of 100 degrees to 300 degrees F., and are next passed to cold end treater 15. In treater 15, the exterior surfaces of the containers are given a thin coating of a conventional lubricity enhancing material which typically may be an organic polymer such as for example polyethylene, a stearate, e.g., polyoxyethylene monostearate, a silicone compound or the like. Purpose of the cold end treatment is to increase resistance of the containers to abrasion, scratching and bursting by rubbing contact during the high speed handling of the containers during subsequent filling, capping, labelling and packaging operations.

During cold end treatment, some of the treating material deposits on the surface of the container finish even when efforts are made to avoid the result. Presence of small amounts of lubricity enhancing agents on the finish surface does not interface with the seal integrity of ordinary closures of the screw type and the like. However, these lubricity enhancing agents do tend to interfere with the bonding or adhesion of a thermoplastic membrane to the treated glass surface and do in fact cause an unacceptable rate of seal failure.

In this invention, containers which have been subjected to a cold end treatment which leaves at least a residue of lubricity enhancing agent on the finish surface are further treated to remove that agent from the finish without affecting the thermoplastic-glass bonding properties imparted by the hot end treatment. This is accomplished by briefly exposing the container finish to an intense, directed heat source 16. The heat source may be a gas burner, a laser or any other narrowly directed but intense source of heat. Exposure time is ordinarily less than five seconds and typically is on the order of one to three seconds. In all cases, surface temperature of the finish must not reach flame polishing temperatures else the effect of the hot end treatment is destroyed. It is also important to avoid heating of the container side walls as that would destroy the effect of the cold end treatment on those surfaces. Surface temperature of the finish immediately after exposure to heat source 16 typically is on the order of 250 degrees to 350 degrees F. but it is postulated that higher surface temperatures were reached during the exposure to the heat source.

In one preferred embodiment, heat source 16 is directed at the container finish from above at about a 45 degree angle as is shown in the drawing. The container is then rotated to expose equally all of the finish surface to the heat source.

After the heat treatment of the finish, while it is still hot, coating of chromium (III) organic metallic complex is spread over the surface by any suitable means, such as roller 17. Suitable chromium complexes are those described in U.S. Pat. Nos. 3,787,326 and 3,900,689, available from du Pont under the trade name Volan. One such compound specifically found useful is the coordination complex of chromium (III) and fumaric acid, described in Example 2 of U.S. Pat. No. 3,878,326. Substituted fumaric trans acids may be employed as well, as shown in this patent. Such trans acids have the formula

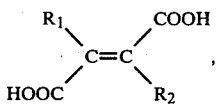

$R_1$ and $R_2$ are the same or different and maybe H, alkyl, —$CH_2COOH$ or phenyl; provided that the total number of carbon atoms is in the range of 4 to 10.

After treatment of the finish surface is complete and the surface has cooled, as shown in FIG. 2, a laminate of aluminum foil 3 and thermoplastic film 2 is placed on the rim of jar 1 with the thermoplastic film 2 contacting the glass rim, a plastic snap cover 4 is placed over the jar mouth as shown, to force the laminate in contact with the rim. A resilient pad 5, is placed over the snap cover and a water-cooled induction heating coil 7, in a chuck or holder 6 of insulating material is placed over pad 5. Thereafter high frequency alternating current is passed through the induction coil to heat aluminum foil 3 and cause the thermoplastic film 2 to bond to the glass rim along sealing surface 8.

While the above description is directed to glass containers leaving the mold of a forming machine, the process for improving the stability of the glass/polymer bond is equally applicable to glass containers more generally, e.g., containers taken from storage. Those containers having a lubricious coating are treated to remove contaminants from the sealing surface, as by heating. The containers, in a manner similar to that described above, are coated with a chemical agent comprising tin and/or titanium oxide precursors, with or without fluorine and/or sulfur oxide and sulfur oxide precursors to form the metal oxide coating. Thereafter the surface is coated with a chromium (III) organic metallic complex.

The following examples set out specific embodiments which serve to more fully illustrate and explain the invention.

EXAMPLE 1

Ten-ounce capacity round glass jars were sealed without treatment of the sealing surface. The jars were sealed with a Surlyn laminated foil using an induction heater, at a pressure of 200 psi. Surlyn is a product available from du Pont comprising ionomers based on Na or Zn salts of ethylene/methacrylic acid copolymers. The duration of the induction heating is adjusted in order that the radius of the ring of thermoplastic softening is approximately half of the radius of the entire closure. The induction field heats from the outer radius first, leaving a ring of melted thermoplastic. Thereafter, the sealed jars were tested for seal durability.

The test used for determining seal durability consisted of sealing jars containing small amounts of water and thereafter, allowing the jars to remain at ambient temperature and humidity in an inverted position.

The evaluation of the state of the seals was performed twice weekly according to the following procedure: the sealed jars were placed in a vacuum chamber and subjected to a vacuum of 7 inches of mercury for a duration of 15 seconds. The survivors were thereafter returned to ambient testing conditions.

Six jars sealed as previously described were subjected to the test conditions and were vacuum evaluated as described above. The results of this test are set out in the following table:

TABLE I

| Vacuum Evaluation, Days After Sealing | Number of Survivors of the Evaluation | Number of Failures of the Evaluation |
|---|---|---|
| 3 | 0 | 6 |

EXAMPLE 2

Containers were treated with tin tetrachloride vapors during their manufacture according to normal production procedures. The containers chosen for testing had a tin oxide layer on the sidewalls of a thickness between 20 and 40 coating thickness units. Such units are standard units for the measurement of the depth of the tin oxide layer and are equal to about 0.8 angstroms. The containers were sealed and tested as previously described in Example 1.

The following table gives the results of the above test.

TABLE II

| Vacuum Evaluation, Days After Sealing | Number of Survivors of the Evaluation | Number of Failures of the Evaluation |
|---|---|---|
| RUN 1 | | |
| 5 | 10 | 0 |
| 8 | 10 | 0 |
| 11 | 10 | 0 |
| 15 | 8 | 2 |
| 19 | 7 | 1 |
| 22 | 5 | 2 |
| 25 | 4 | 1 |
| 29 | 4 | 0 |
| 32 | 3 | 1 |
| 36 | 1 | 2 |
| 39 | 1 | 0 |
| 43 | 0 | 1 |
| RUN 2 | | |
| 4 | 10 | 0 |
| 7 | 10 | 0 |
| 10 | 10 | 0 |
| 14 | 9 | 1 |
| 18 | 9 | 0 |
| 21 | 7 | 2 |
| 24 | 5 | 2 |
| 28 | 4 | 1 |
| 31 | 3 | 1 |
| 35 | 1 | 2 |
| 38 | 0 | 1 |
| RUN 3 | | |
| 4 | 10 | 0 |
| 8 | 6 | 4 |
| 11 | 6 | 0 |
| 19 | 4 | 2 |
| 25 | 3 | 1 |
| 29 | 3 | 0 |
| 32 | 2 | 1 |
| 36 | 1 | 1 |
| 39 | 0 | 1 |
| RUN 4 | | |
| 4 | 10 | 0 |
| 7 | 9 | 1 |
| 11 | 9 | 0 |
| 15 | 7 | 2 |
| 18 | 6 | 1 |
| 21 | 5 | 1 |
| 24 | 2 | 3 |
| 27 | 2 | 0 |
| 31 | 1 | 1 |
| 34 | 1 | 0 |

TABLE II-continued

| Vacuum Evaluation, Days After Sealing | Number of Survivors of the Evaluation | Number of Failures of the Evaluation |
|---|---|---|
| 38 | 1 | 0 |
| 41 | 0 | 1 |

EXAMPLE 3

Nine untreated jars identical to those tested in Example 1 were chosen for the following treatment. Each jar was rotated under an air, natural gas torch, the burner flame playing on the rim of the jar for 15 seconds. Immediately, thereafter, chromium III fumerate (Volan) was dabbed uniformly onto the sealing surface. Thereafter, the jar was cooled, sealed, and tested as described in Example 1.

The following table shows the results of this test:

TABLE III

| Vacuum Evaluation, Days After Sealing | Number of Survivors of the Evaluation | Number of Failures of the Evaluation |
|---|---|---|
| 4 | 6 | 3 |
| 8 | 4 | 2 |
| 11 | 0 | 4 |

EXAMPLE 4

Ten tin tetrachloride treated samples prepared as described in Example 2 were treated with Volan as described in Example 3. Thereafter, the jars were sealed and tested as described in Example 1.

The following table gives the results of the above tests:

TABLE IV

| Vacuum Evaluation, Days after Sealing | Number of Survivors of the Evaluation | Number of Failures of the Evaluation |
|---|---|---|
| 3 | 10 | 0 |
| 6 | 10 | 0 |
| 10 | 10 | 0 |
| 13 | 10 | 0 |
| 16 | 10 | 0 |
| 20 | 9 | 1 |
| 23 | 9 | 0 |
| 26 | 9 | 0 |
| 29 | 9 | 0 |
| 33 | 8 | 1 |
| 37 | 8 | 0 |
| 40 | 8 | 0 |
| 43 | 8 | 0 |
| 47 | 8 | 0 |
| 52 | 7 | 1 |
| 54 | 6 | 1 |
| 57 | 6 | 0 |
| 61 | 6 | 0 |
| 65 | 5 | 1 |
| 68 | 5 | 0 |
| 73 | 3 | 2 |
| 75 | 3 | 0 |
| 80 | 2 | 1 |
| 83 | 2 | 0 |
| 91 | 2 | 0 |
| 97 | 2 | 0 |
| 101 | 2 | 0 |
| 104 | 2 | 0 |
| 108 | 2 | 0 |
| 111 | 2 | 0 |
| 118 | 2 | 0 |
| 126 | 2 | 0 |
| 132 | 2 | 0 |
| 136 | 2 | 0 |
| 141 | 2 | 0 |
| 143 | 1 | 1 |
| 146 | 1 | 0 |
| 150 | 1 | 0 |
| 153 | 0 | 1 |

The improved jar top closure of the present invention has significant advantages over the conventional closures now employed, e.g., plastic or metal screw-on caps. Good durable seals are produced for many liquid products, such as salad dressing, honey, syrups, ketchup and spaghetti sauce. Since the membrane seal must be broken to remove the contents, the container is tamper evident. The snap-cap and foil plastic seal system is economical and results in considerable savings over conventional sealing systems. Since the sealing membrane is flexible and is in adhesive contact with the container at its rim portion, the container opening may have a large number of shapes. For example, it may be oval, square, have a pour spout, etc.

Elimination of the necessity for screw threads enables the use of containers having more aesthetic designs, which can be employed for other purposes such as vases, etc. after they are emptied. The membrane closure eliminates any torque problems due to the sticking of a screw cap, and avoids rusting and corrosion difficulties.

We claim:

1. A method for preparing the surface of a rim-like opening in a glass container for use with a thermoplastic membrane, said rim-like opening having a sealing surface, comprising:
   removing any contaminant material, if present, from the sealing surface;
   treating said surface with a chemical agent comprising at least one metal oxide precursor selected from the group consisting of tin oxide and titanium oxide precursors and mixtures thereof and forming, respectively, a tin or titanium oxide or a mixture thereof coating on said surface,
   applying a chromium (III) organic metallic complex to said surface.

2. The method of claim 1 wherein the chromium (III) organic metallic complex is a trans acid having the formula

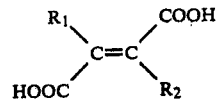

wherein $R_1$ and $R_2$ may be the same or different, $R_1$ and $R_2$ may be H, alkyl, $-CH_2COOH$ or phenyl, and the total number of carbon atoms is an integer in the range of 4 to 10.

3. The method of claim 2 wherein the chemical agent comprises in addition zero to one or more of a composition selected from the group consisting of fluorine compounds, sulfur oxides and sulfur oxide precursors and mixtures thereof, the said treatment with the chemical agent being conducted at an elevated temperature below the flame polishing temperature.

4. The method of claim 3 wherein the metal oxide precursor compound is selected from a member of the group consisting of tin chlorides and titanium chlorides.

5. The method of claim 4 wherein the fluorine compound is a member of the group consisting of NH4SnF3, (CH3)2SnF2, alkyl fluorides, SnF4, BF3, AlF3, NH4F and NH4HF2.

6. The method of claim 5 wherein the trans acid is fumaric acid.

7. The method of claim 6 wherein the chemical agent employed in treating the surface is essentially a tin chloride.

8. The method of claim 6 wherein the chemical agent employed in treating the surface is essentially a titanium chloride.

9. The method of claim 6 wherein the chemical agent employed in treating the surface is essentially a mixture of tin and titanium chlorides.

10. A method for preparing the finish of a glass container including side walls for use with a thermoplastic membrane closure comprising:
   subjecting the container finish while hot after forming and before annealing to treatment with a chemical agent comprising contacting said container finish with a metal oxide precursor selected from the group consisting of tin oxide and titanium oxide precursors and mixtures thereof which decompose to form materials comprising tin oxide, titanium oxide and mixtures thereof, respectively, at the container temperature, which renders the finish surface adherable to a thermoplastic membrane;
   annealing said container;
   subjecting the annealed container to a cold end treatment wherein the exterior container including the side walls is coated with a lubricity enhancing agent, and
   removing said lubricity enhancing agent from the finish surface by briefly exposing said surface to an intense heat source and heating it to below flame polishing temperature while avoiding the destruction by heat of the effect of the cold end treatment on the side walls, and thereafter coating the finish with a chromium (III) organic metallic complex.

11. The method of claim 10 wherein the chromium (III) organic metallic complex is a chromium III complex of a trans acid having the formula

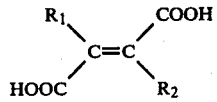

wherein R1 and R2 may be the same or different, R1 and R2 may be H, alky, —CH2COOH or phenyl, and the total number of carbons atoms is an integer in the range of 4 to 10.

12. The method of claim 11 wherein the finish surface is exposed to the intense heat source by rotating beneath a gas burner for a time of less than about five seconds.

13. The method of claim 11 wherein the chemical agent comprises in addition zero to one or more compositions selected from the group consisting of fluoride compounds decomposable at the hot container temperature, sulfur oxides and sulfur oxide precursors decomposable at the hot container temperature.

14. The method of claim 13 wherein said metal oxide precursor is selected from the group consisting of tin chlorides and titanium chlorides.

15. The method of claim 14 wherein said fluoride compound consists of at least one member of the group consisting of NH4SnF3, (CH3)2SnF2, alkyl fluorides, SnF4, BF3, ALF3, NH4F and NH4HF2.

16. The method of claim 15 wherein the trans acid is fumaric acid.

17. The method of claim 16 wherein the chemical treatment is essentially with a tin chloride.

18. The method of claim 16 wherein the chemical treatment is essentially with a titanium chloride.

19. The method of claim 16 wherein the chemical treatment is essentially with a mixture of tin and titanium chlorides.

20. A method for sealing an opening in a glass container having side walls comprising:
   providing a rim-like sealing surface around said opening;
   treating said sealing surface at a high temperature with a chemical agent comprising a metal oxide precursor selected from the group consisting of tin oxide and titanium oxide precursors and mixtures thereof which decomposes to form tin oxide, titanium oxide and mixtures thereof, respectively, at the container temperature, which renders said surface adherable to a thermoplastic membrane;
   coating the exterior surface of said container including said side walls with a lubricity enhancing agent;
   removing said lubricity enhancing agent from only said sealing surface by briefly exposing said surface to an intense heat source and heating it to below flame polishing temperature while avoiding destruction by heat of the effect of the lubricity enhancing treatment on the side walls,
   thereafter coating the finish surface with a chromium (III) organic metallic complex, and
   pressing a membrane comprising a thermoplastic material against said sealing surface at a temperature above the softening point but below the melting point of said thermoplastic.

21. The method of claim 20 wherein the chromium (III) organic metallic complex is a chromium III complex of a trans acid having the formula

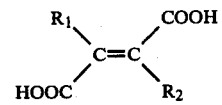

wherein R1 and R2 may be the same or different, R1 and R2 may be H, alky, —CH2COOH or phenyl, and the total number of carbon atoms is an integer in the range of 4 to 10.

22. The method of claim 21 wherein the chemical agent comprises in addition zero to one or more compositions selected from the group consisting of fluoride compounds decomposable at the hot container temperature sulfur oxides and sulfur oxide precursors decomposable at the hot container temperature.

23. The method of claim 22 wherein said metal oxide precursor is selected from the group consisting of tin chlorides and titanium chlorides.

24. The method of claim 23 wherein said fluoride compound consists of at least one member of the group consisting of $NH_4SnF_3$, $(CH_3)_2SnF_2$, alkyl fluorides, $SnF_4BF_3$, $ALF_3$, $NH_4HF_2$.

25. The method of claim 24 wherein the trans acid is fumaric acid.

26. The method of claim 25 wherein the high temperature treatment with a chemical agent is essentially with a tin chloride.

27. The method of claim 25 wherein the high temperature treatment with a chemical agent is essentially with a titanium chloride.

28. The method of claim 25 wherein the high temperature treatment with a chemical agent is essentially with a mixture of tin and titanium chlorides.

29. The method of claim 20 wherein said container is annealed after treatment with said chemical agent but before coating the exterior surface thereof with a lubricity enhancing agent.

30. The method of claim 20 wherein the lubricity enhancing agent is removed from said sealing surface by rotating said surface beneath a gas burner for a time of about five seconds.

31. The method of claim 20 wherein said membrane comprises a thermoplastic film adhesively joined on one face to a metal foil.

32. The method of claim 20 wherein said glass is a soda-lime-silica glass.

* * * * *